UNITED STATES PATENT OFFICE.

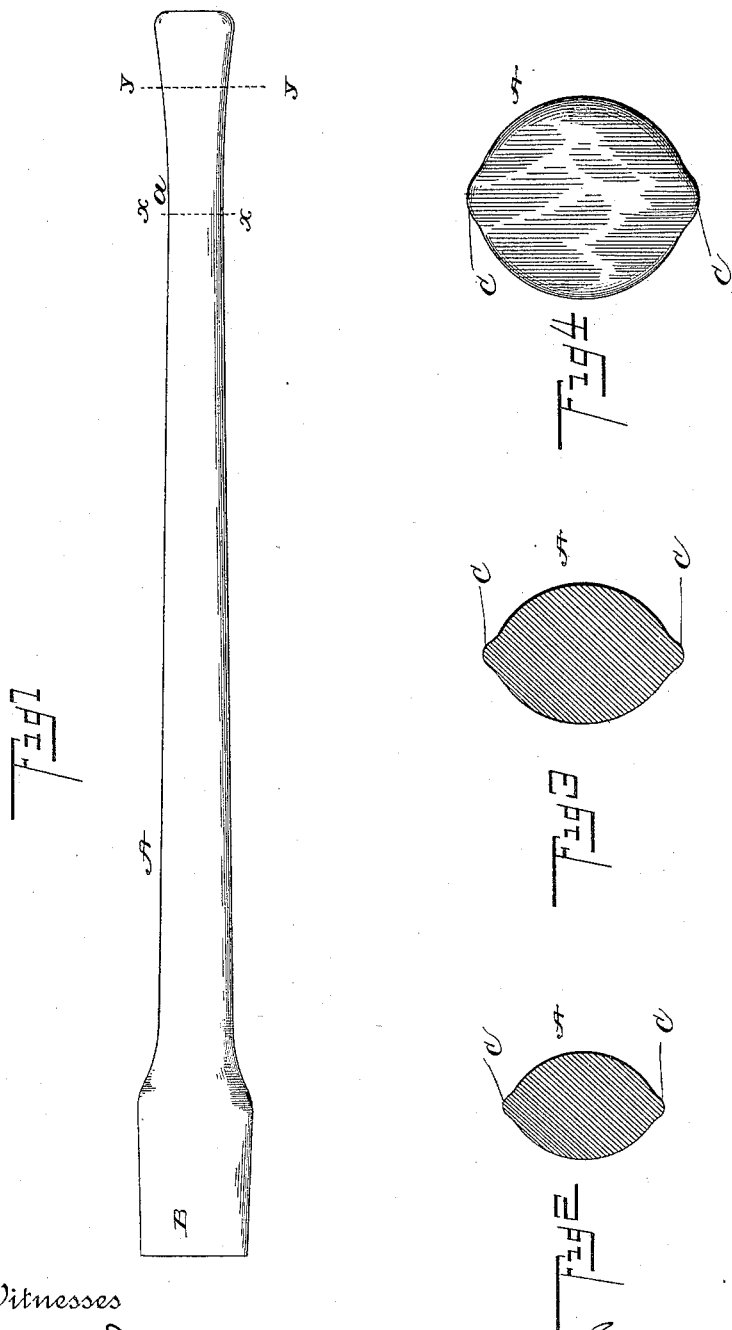

CLARENCE RADER, OF SHAWNEE, OHIO.

PICK-HANDLE.

SPECIFICATION forming part of Letters Patent No. 466,703, dated January 5, 1892.

Application filed May 21, 1891. Serial No. 393,638. (No model.)

*To all whom it may concern:*

Be it known that I, CLARENCE RADER, a citizen of the United States, residing at Shawnee, in the county of Perry and State of Ohio, have invented certain new and useful Improvements in Pick-Handles; and I do hereby declare that the following is a full, clear, and exact description of the invention, which will enable others skilled in the art to which it appertains to make and use the same.

This invention relates to pick-handles; and it has for its object to provide a simple and improved article of this character designed to obviate cramping of the hand of the operator, and at the same time prevent accidental disengagement of the hand from the handle.

A further object of my invention is to provide a handle of this character which will possess advantages in point of inexpensiveness and durability in construction, convenience in use, and general efficiency.

In the drawings, Figure 1 is a side elevation of a pick-handle embodying my invention. Fig. 2 is a transverse sectional view taken on the line $x\,x$, Fig. 1. Fig. 3 is a similar view taken on line $y\,y$, Fig. 1. Fig. 4 is an end view.

Corresponding parts in the figures are denoted by the same letters of reference.

Referring to the drawings, A designates the handle, which is provided at its outer end with a suitable broadened head B, upon which the pick is secured. From the head B the handle gradually tapers to the point $a$, from whence it flares outwardly to the extreme forward end of the handle.

The shape of the handle, which constitutes an important feature of my invention, is best understood by reference to Figs. 2, 3, and 4 of the drawings.

The portion of the handle upon which the hand is adapted to slide—that is, from near the center to the line $x\,x$—is approximately of the same cross-sectional contour shown in Fig. 2. At the point on which the latter section is taken the contour is approximately elliptical, the upper and lower sides terminating in a slight rib or ridge C C. By this formation the handle is adapted to fit closely within the operator's hand and turning of the pick when in use thus obviated without the necessity of tightly gripping the handle, as in the case of the common form of handles now in use.

The portion of the handle from the line $x\,x$ to the line $y\,y$ gradually assumes a more rounded form, the rib C being still prominent, while from the line $y\,y$ to the extreme end of the handle the breadth of the handle is still gradually increased.

The purpose of gradually flaring the forward end of the handle in lieu of forming an abrupt knob will be obvious to those skilled in the use of that class of tools to which my invention applies. The handle being grasped lightly in the hand of the operator, the hand as it comes in contact with the flaring portion gradually binds tighter thereon, the purchase upon the handle being sufficiently increased before the end of the latter is reached to prevent the same from slipping entirely from the hand.

The form in cross-section of the handle causes it to fit more accurately in the operator's hand, and thus obviates the necessity of its being grasped as firmly as is necessary in the case of those handles in which the ribs at the upper and lower sides are absent, and therefore, as is obvious, the work will be less laborious to the operator using the implement.

I claim as my invention—

As an improved article of manufacture, a handle for picks and the like formed at its outer end with a tool-head, from thence inwardly tapering for approximately two-thirds its length, and finally flaring outwardly at all sides to the extreme inner end of the handle, said handle being approximately elliptical in cross-section and formed with a slight longitudinal rib or ridge C at its upper and lower sides, substantially in the manner described, and for the purpose set forth.

In testimony whereof I affix my signature in presence of two witnesses.

CLARENCE RADER.

Witnesses:
RICHARD THOMSON,
CHAS. T. GRIFFITHS.